United States Patent Office
3,428,423
Patented Feb. 18, 1969

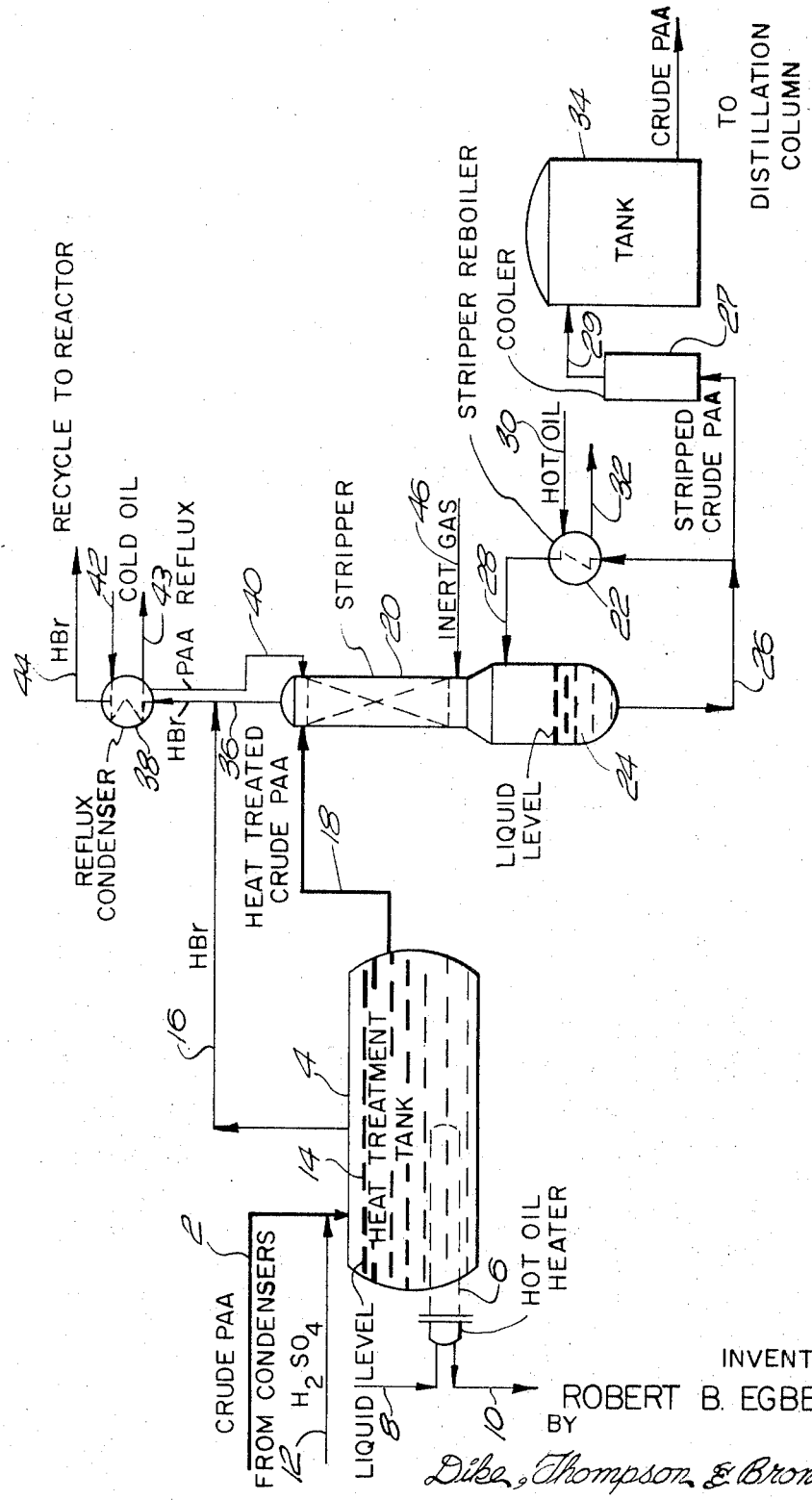

3,428,423
METHOD FOR THE REMOVAL AND RECOVERY OF PROMOTER FROM CRUDE PHTHALIC ANHYDRIDE MADE BY THE VAPOR PHASE OXIDATION OF ORTHOXYLENE IN THE PRESENCE OF PROMOTER
Robert B. Egbert, Stamford, Conn., assignor to Chemical Process Corporation, Stamford, Conn., a corporation of Massachusetts
Filed June 7, 1966, Ser. No. 555,900
U.S. Cl. 23—154    23 Claims
Int. Cl. B01d 3/40; C07c 51/42; C07d 5/38

ABSTRACT OF THE DISCLOSURE

Removal of HBr from crude phthalic anhydride by passing the crude phthalic anhydride through a fractionating stripper column in countercurrent flow with phthalic anhydride vapor, whereby the phthalic anhydride vapor strips the HBr from the crude phthalic anhydride. The phthalic anhydride vapor containing the stripped HBr may be condensed and refluxed back to the stripper column.

The crude phthalic anhydride is first subjected to a heat treating step to remove therefrom as vapors HBr and water, and is derived from the catalytic oxidation of o-xylene in the presence of a bromine promoter, which is the source of the HBr in the crude.

The stripping and/or heating steps may be carried out at superatmospheric pressure and the HBr removed thereby may be recycled back to the reactor as a source of promoter.

---

The present invention relates to a unique method for the removal, recovery and recycle of bromine promoter from crude phthalic anhydride (hereinafter referred to as PAA) made by the vapor phase oxidation of o-xylene in the presence of a bromine promoter.

A commercially attractive method for making PAA is by the fluid bed, catalytic, vapor phase oxidation of o-xylene with oxygen-containing gas, e.g. air. The fluid bed catalyst used is a vanadium oxide catalyst fluxed with a compound of $SO_3$ and alkali metal oxide in a molar ratio substantially greater than one and supported on a porous silica gel support. The crude PAA is condensed from the product gas from the reaction zone in liquid and solid condensers, and the final PAA product is obtained from the condensates by heat treatment and distillation. However in order to achieve commercially competitive yields with this method of producing PAA, a bromine promoter, such as elemental bromine or HBr, in the vapor phase in the reaction zone is necessary.

Although the use of such promoter makes possible excellent PAA yields, it also introduces serious problems which have to be overcome in order for the process to be made commercially feasible. Such problems are as follows:

(1) Certain of the bromine compounds in the product gases from the reaction zone and condensed with the crude PAA are highly corrosive to conventional PAA refining equipment even in very small quantities, and may result in contamination and discoloration in the final PAA product. Accordingly, it is an object of this invention to remove the aforesaid harmful bromine compounds from the crude PAA collected from the condensers. In attempting to do this, it was found that substantially complete removal of such harmful bromine compounds without sacrifice in PAA yield was quite difficult to achieve, and the presence of only small residual amounts thereof in the PAA was harmful. Accordingly, it is an object of the invention to provide a method for removal, without any substantial sacrifice in PAA yield, of substantially all of said harmful bromine compounds;

(2) It is necessary to settle for substantially less than maximum PAA yield because the cost of the additional bromine promoter to achieve the maximum yield (the yield increases with increased concentrations of bromine promoter up to an inversion point) exceeds the value of such additional yield i.e., the economic optimum is achieved at a yield substantially less than maximum, it being necessary, as with most chemical processes, to balance increased yield against the cost of achieving it. Accordingly, it is an object of this invention to achieve an economic optimum in the aforesaid method with substantially higher yields, closely approaching maximum yield. Put in another way, an object is to achieve higher yields without substantially increasing the cost; and (3) The disposal of the harmful bromine compounds, removed from the crude PAA as aforesaid, presents a problem, since they are toxic and corrosive and thereby can present a water and air pollution problem. Accordingly, it is an object of the present invention to overcome such disposal problem.

The achievement of an economic optimum with higher yields, as aforesaid, and the aforesaid solution to the disposal problem are provided in accordance with the present invention, by recovering the aforesaid harmful bromine compounds removed from the crude PAA in a chemical form suitable to function, as is, in the reactor as a promoter, and recycling such recovered bromine compounds back to the o-xylene oxidation reaction zone. In this way, concentration of bromine promoter in the reaction zone can be maintained at an optimum amount to achieve close to maximum yield with the addition of less fresh bromine promoter to thereby achieve higher yields commensurate with the economic optimum for the process. At the same time, the aforesaid disposal problem is solved, as well as the corrosion and contamination problems presented by the bromine compounds in the crude PAA if not removed.

Fortunately, it has been discovered that the bromine compounds in the crude PAA condensate which produce the most harmful effects are the hydrogen bromide (HBr) dissolved in the crude PAA and certain bromine compounds or adducts, which are formed in the process and which are heat decomposable or heat labile, i.e. unstable to heat, into HBr. These bromine compounds are those in which the bromine is not attached directly to an aromatic ring. Therefore, in accordance with the present invention the crude PAA from the condensers is subjected to a heat treatment step in which it is raised to an elevated temperature closely approximating the boiling point of the PAA, i.e. to a temperature of between about 500 and 600° F., preferably between 520° F. and 550° F., and kept at that temperature until evolution of HBr substantially ceases, to thereby drive off dissolved bromine in the form of HBr, water vapor and low boiling organics, and to decompose the heat decomposable bromine compounds or adducts, i.e. those compounds in which the bromine is not attached directly to an aromatic ring, into HBr, which is driven off as a vapor. As the crude PAA is heated and is maintained at the elevated temperature, the rate of evolution of the HBr will increase. Finally, it will commence to decrease until it substantially ceases. This is an indication that substantially all the HBr which can be driven off by heat has been driven off and that all the heat decomposable bromine products have been decomposed into HBr, which has been driven off.

However, it was found that although this removed a large part of the harmful bromine products in the crude PAA, nevertheless, a small residual amount remained, mostly in the form of dissolved HBr. The removal of such residual amount without sacrifice in PAA yield and without excessively increasing equipment cost was a remaining problem to be overcome. It was overcome in accordance with the present invention by passing the liquid, heat-treated crude PAA through a fractionating stripper column in countercurrent flow with PAA vapors generated by boiling (preferably slightly more than 550° F.) liquid PAA in a reboiler associated with the stripper. The liquid PAA feed to the reboiler to provide the PAA vapors for the stripper is preferably the stripped heat-treated PAA from the liquid PAA output from the stripper and from which the residual harmful bromine products have been stripped. Accordingly, the PAA vapors are stripped, heat-treated PAA vapors.

Preferably the heat treated liquid PAA is fed to the top of the stripper and moves downwardly through the fractionating stripper column by force of gravity with the PAA vapors moving upwardly through the column. The fractionating stripper column is preferably packed or provided with conventional type plates or sieve trays to achieve intimate contact between the ascending PAA vapors and the descending crude liquid PAA.

The PAA vapors from the fractionating stripper column containing the stripped residual HBr, together with the HBr and water vapors removed from the crude PAA by the heat treatment step (these vapors from the heat treatment step also contain some PAA vapors as well as other volatile organics), are passed through a reflux condenser or condensers to condense out the PAA, which is refluxed back to the top of the fractionating stripper column.

The HBr and water vapors from the reflux condenser can be discarded but preferably, in accordance with an important aspect of the present invention, they are recycled back to the o-xylene oxidation reaction zone to supply part of the optimum bromine promoter concentration in the reaction zone to achieve close to maximum yields. Preferably, they are added to the bottom of the reaction zone, i.e. the fluid catalyst bed, slightly above the catalyst support grid.

Preferably the heat treatment and stripping steps are carried out under superatmospheric pressure, e.g. between about 15 or 20 p.s.i.g. and 100 p.s.i.g., so that the recycled HBr from the reflux condenser can be introduced into the o-xylene oxidation reaction zone under superatmospheric pressure. In this respect, it is pointed out that the o-xylene, air and promoter feeds to the reactor are usually at superatmospheric pressure to overcome the pressure drop, e.g. 20-35 p.s.i.g., in the system, and preferably the recycled HBr and water vapors from the reflux condenser are 5 or 10 p.s.i. above the reactor input pressure.

Of course, the reaction can be carried out at higher pressures in which case the recycled HBr may be recovered and fed back to the reactor zone at correspondingly higher pressures.

Particularly where the stripping operation is carried out under superatmospheric pressure, an inert gas, such as nitrogen, is injected into the base of the fractionating stripper column to reduce the required PAA partial pressure in the column, and thereby permit the PAA to be vaporized at the superatmospheric pressure at temperatures at or slightly above its boiling point at atmospheric pressure, i.e. between about 540 and 600° F., preferably 540-560° F. Of course, higher stripper temperatures can be used, so long as they are not so high that undesirable side reactions, e.g. decomposition of PAA, will occur. The same is true of the maximum temperature in the heat treatment step. When inert gas is used, it moves upwardly in the stripper column with the PAA vapor countercurrent to the downward flow of heat treated liquid PAA.

Although the PAA stripping vapor has been described as being generated in a tubular reboiler heated by hot oil, it may be generated without a reboiler by use of sensible heat added to the inert gas feed by raising its temperature above that in the base of the stripper, in conjunction with sensible heat in the liquid PAA feed to the stripper, i.e. the heat evolved by drop in liquid temperature in the stripper, to provide the vaporization latent heat required. However, in most cases, it is preferred to add the required latent heat to generate the PAA stripping vapor by use of a reboiler alone or the reboiler in conjunction with sensible heat in the inert gas because it is preferable that the temperature of the liquid feed to the stripper be below the base temperature of the stripper.

The advantages of the use of stripped heat-treated PAA vapors for the aforesaid stripping are (1) there is no contamination of the PAA, (2) the PAA vapors used for stripping can be refluxed back into the system together with the PAA vapors from the heat treatment step and (3) any small residual amount of uncondensed PAA is returned with the recovered HBr to the reaction zone, so that there is no significant reduction in PAA yield. Furthermore, the same reflux condenser operation required to recover the PAA vapors from the heat treatment step can be used to condense the PAA vapors used for stripping. Thus, by the use of PAA vapor stripping, substantially all of the harmful dissolved and heat decomposable bromine compounds can be removed from the crude PAA and can be recovered and reused for only a small additional equipment cost and without decreasing the PAA yield. Furthermore, by the use of the aforesaid heat treatment step and of PAA vapors and inert gas for stripping under pressure the heat treated crude PAA, the bromine is recovered in a form in which it can be recycled directly back to the reactor zone with no further treatment except for condensing out the PAA and refluxing it back to the stripper.

The removal of substantially all of the aforesaid harmful bromine compounds from the crude PAA protects the PAA refining system, i.e., the distillation equipment and apparatus associated therewith, including conduits, tanks, valves, etc., against corrosion and resulting discoloration of the PAA due to such bromine compounds.

Preferably, sulfuric acid or other strong mineral acid, such as nitric acid, is added to the crude PAA before or during the heat treatment step in order, among other objectives, to decompose during such step any acid-decomposable or acid-labile bromine adducts, e.g. the inorganic bromides, in the crude PAA into HBr, which is removed from the system during the heating step. Such acid-labile bromides are sometimes formed in the process. When sulfuric acid is used, the HBr and water vapors and other volatiles removed from the heat treatment tank also contain $SO_2$.

The crude PAA also contains relatively small amounts of brominated compounds which are formed in the reaction zone and which are not heat or acid-decomposable and hence which are not removed during the heat treatment and stripping steps. Such compounds are those in which the bromine is attached to an aromatic ring. Fortunately, these brominated compounds have been shown to be harmless due to their inherent stability. They can be separated from the PAA in the subsequent distillation step.

The accompanying FIG. 1 is a diagrammatic drawing of apparatus for carrying out the method of the present invention. It is also effective as a flow sheet to show the flow of materials.

EXAMPLE

With reference to FIG. 1, crude liquid PAA at about 300° F., made by the vapor phase, catalytic, fluid bed, bromine promoted air oxidation of o-xylene as set forth in greater detail below, was introduced through line 2 into a heat treatment tank 4 which is provided with a heating unit 6, e.g. a hot oil heater with inlet 8 and outlet 10, to heat the crude PAA to a temperature approaching its boiling point, i.e. a temperature of between about 520–550° F. (it may be heated to a temperature of between about 500 and 600° F.).

The crude PAA, introduced into the tank 4 through line 2 was made, as aforesaid, by the vapor phase air oxidation of o-xylene in a fluid, catalytic bed reaction zone (not shown) and in the presence in the vapor phase of a bromine promoter, namely HBr. The fluid catalyst was a vanadium oxide catalyst which was supported on a highly porous, finely divided silica gel and which was fluxed with a compound of $SO_3$ and alkali metal (potassium) oxide in which the molar ratio of $SO_3$ to alkali metal oxide was greater than one (e.g. 1.9 to 2.0 in the equilibrium catalyst). The ratio of air to o-xylene was between about 9/1 and 13/1 (it may be between about 7.5/1 and 20/1). The amount of HBr (including newly added HBr and recycled HBr) was between about 0.5 and 2.0% (it may be between 0.1 and 5%) by weight of the o-xylene and the reaction temperature was between 670–690° F. (it may be between about 550° F. and 750° F., preferably between about 620–700° F.). Instead of HBr elemental bromine or other bromine compounds, which have the property of dissociating into bromine or HBr at reactor conditions, can be used, e.g., inorganic bromides, such as nitrosyl or ammonium bromide, and organic bromides such as ethyl or other lower alkyl bromides, benzyl, acetyl or xylyl bromide, ethylene dibromide, carbon tetrabromide, etc. The heated air (containing newly added HBr) and o-xylene (in the form of a vapor or liquid spray) were introduced separately under pressure at the bottom of the fluid bed reactor, the air being introduced through the grid and the o-xylene being fed into the fluid bed just above the grid. The feed flow and pressure were adequate to maintain the catalytic bed fluid and to compensate for pressure drop in the system, e.g. 20–35 p.s.i.g. or higher. The recycled HBr at a pressure 5 or 10 p.s.i. above feed pressure was introduced into the bottom of the reactor just above the catalyst supporting grid.

The product gases from the top of the reactor (not shown), after removal of entrained catalyst, were passed through a liquid condenser (not shown), in which the PAA in the product gas was condensed as a liquid, and then through a plurality of solid condensers (not shown), in which substantially all of the remaining PAA in the product gas was condensed as a solid. The solid crude PAA deposited in the solid condensers was melted out and combined with the liquid crude PAA from the liquid condensers and fed to the heat treatment tank 4 through line 2 in FIG. 1, as shown.

Sulfuric acid (98%) in an amount ranging from between about .01 and 1.0% by weight of the crude PAA was added to the crude PAA in line 2 through line 12, as shown in FIG. 1, before feeding it to the heat treatment tank 4. However, the sulfuric acid may be omitted where the amount of acid-decomposable bromine adducts in the crude PAA is negligible. In most cases, the amount of acid-decomposable bromine adducts in the crude PAA is very small compared to the amount of heat-decomposable bromine adducts.

The liquid level 14 of the PAA was maintained below the top of tank 4, as shown, to provide a vapor space above the liquid PAA.

The time it takes to heat the crude PAA in tank 4 up to a temperature of between about 520° F. and 550° F. depends on the capacity of the tank and the size of the oil heater 6. It was noted that as the temperature was increased, HBr and water vapors, as well as $SO_2$, when sulfuric acid was used, were driven off at an increased rate and they were removed through the line 16. After reaching between 520° F. and 550° F., this temperature was maintained for a soaking period until the evolution of HBr substantially ceased. During the soaking period, some vaporization of the PAA occurred so that the vapors removed at 16 contains PAA. The evolved HBr was the HBr dissolved in the crude PAA as well as the HBr generated by heat decomposition of the heat decomposable organic bromine products or adducts, and the HBr generated by the acid decomposition of the inorganic bromides by the sulfuric acid. It is believed that the dissolved HBr was evolved first. The heating at the aforesaid soaking temperature was continued until substantially all the dissolved HBr which could be driven off by heat was driven off and until substantially all the heat-decomposable and acid-decomposable bromine compounds were decomposed into HBr and such HBr driven off. This point can be determined by observing the HBr evolution. Substantial cessation of HBr evolution indicates that this point has been reached. The total heating time to reach this point in commercial scale equipment may vary over a wide range, e.g. a time of from 15 to 30 hours (about 5 to 8 hours to heat to 520–550° F. and the rest of the time being soaking time at 520–550° F.) has proved satisfactory. The soaking temperature in the heat treatment tank may be higher than 550° F. so long as it is not so high as to cause undesirable side reactions, e.g. decomposition of PAA, but it is best not to use much higher temperatures because this increases PAA vaporization to thereby increase unnecessarily the amount of PAA vapors which must be condensed by the reflux condenser.

The water vapor removed through line 16 resulted from the conversion of phthalic acid to PAA and the $SO_2$ resulted from chemical reaction of the $H_2SO_4$ with certain impurities in the crude PAA. The vapors in line 16 also contain volatile organic by-products driven off from the PAA.

Preferably, the pressure in the heat treatment tank is superatmospheric, e.g. between 15 or 20 p.s.i.g. and 100 p.s.i.g., particularly when the evolved vapors are recycled back to the reaction zone as aforesaid, but it need not be. In this example, the pressure in the heat treatment tank was about 40 p.s.i.g.

The heat treatment may be of the batch type or continuous. Where it is continuous, the tank is relatively long and an increasing temperature gradient is maintained between the inlet end and the exit end with a plurality of baffles extending upwardly from the bottom of the tank and located at intervals along the length of the tank with continuous slow flow of the crude PAA around the baffles from the inlet end to the exit end. The exit end section is at about 520–550° F. By the time the crude liquid PAA flows out of the exit end it has been retained at a temperature of about 520–550° F. until HBr evolution has substantially ceased. In the case of batch heating, the batch is heated up to 520–550° F. and kept there until HBr evolution substantially ceases and then the crude PAA is removed from the batch tank to the next step.

The heat treated crude liquid PAA removed from the heat treatment tank at 18 and at a tempreature of 520–550° F. still contained some residual harmful bromine compounds, e.g. the dissolved HBr in the liquid PAA which was in equilibrium with that in the vapor in the heat treatment tank. To remove this residual HBr, such heat treated crude PAA was introduced from line 18 into the top of stripper fractionating column 20, as shown, and flowed downwardly through such column 20 countercurrently with an upward flow of PAA vapors generated by stripper reboiler 22, the ascending PAA vapors stripping from the descending crude liquid PAA substantially all of the remaining residual dissolved HBr and heat decomposable HBr products from the crude PAA. Also, if any phthalic acid were left in the heat treated PAA, it would be converted into PAA and water vapor in the stripper, the water vapor being stripped out of the crude PAA by the ascending PAA vapors. In effect, the ascending PAA vapors are washed with the descending liquid PAA, enriching the vapor phase with the more volatile components, specifically HBr, in the heat treated PAA liquid feed stream.

The stripped heat treated liquid PAA collected at the bottom of the stripper at 24 and flowed through line 26 to a cooler 27 (preferably an oil cooler). Part of the stripped liquid PAA was fed from line 26 (before cooler 27) to the stripper reboiler 22 to generate the PAA stripping vapors which pass through line 28 to the bottom of the stripper fractionating column 20 and thence upwardly through the column. The stripped liquid PAA was vaporized in stripper reboiler 22 to provide the PAA vapors by hot oil inletting at 30 and outletting at 32. The ascending hot PAA stripping vapors in column 20 coming in contact with the descending, heat-treated liquid PAA, vaporizes the more volatile components in the liquid phase, which join the ascending PAA vapors.

The cooled, stripped, liquid PAA from cooler 27, now substantially free from dissolved HBr and heat and said decomposable bromine compounds, was collected through line 29 in tank 34, where it was tested to make sure all of the HBr was removed and from which it was fed to a distillation column (not shown) to recover the cemmercially pure final PAA product from the heat treated and stripped crude.

It was found that only bromine compounds left in the crude PAA in tank 34 were those in which the bromine is attached directly to an aromatic ring and a substantial amount of this was removed with the pitch in the distillation column. These kinds of brominated compounds are not corrosive at the processing conditions employed and do not present any product discoloration or disposal problems.

The PAA stripping vapors, containing stripped HBr, emerged from the top of the stripper fractionating column 20 through line 36, where they joined the HBr and water vapors from the heat treatment tank in line 16, all of such vapors being passed through reflux condenser 38 in which most of the PAA was condensed to a liquid and was refluxed back to the top of the stripper fractionating column 20 through line 40. The temperature in the reflux condenser was kept well below the boiling point of the PAA, e.g. 400° F., to condense it by means of cold oil inletting at 42 and outletting at 43. The HBr, water vapors, $SO_2$ and other volatile products removed from the heat treatment tank through line 16 and from the stripper column by the stripping action were removed from the reflux condenser at 44 and were recycled back to the bottom of the o-xylene oxidation reaction (not shown) slightly above the catalyst support grid.

The temperature in the stripper column 20 was slightly higher than the exit temperature of the crude liquid PAA in the heat treatment tank, e.g. between about 540 and 560° F.

Especially where the HBr is recycled back to the reaction zone, the stripper operation is preferably carried out at superatmospheric pressure, preferably the same as that used in the heat treatment tank, i.e. between about 15 or 20 p.s.i.g. and 100 p.s.i.g. (40 p.s.i.g. in the example). In any event, where the HBr vapor is recycled back to the reactor, the pressure of the vapors leaving the reflux condenser 38 should be about 5 or 10 p.s.i. above the inlet pressure of the o-xylene, air and bromine promoter feeds to the bottom of the reactor, which may be 20 to 35 p.s.i.g. or more, so as to avoid the necessity of compressing the recycle stream to the reaction zone. Preferably a pressure control is located in line 16 so that the temperature and pressure maintained in the heat treatment tank 4 can be independent of those in the stripper column 20.

Especially where the stripping operation is carried out under superatmospheric pressure, a small, controlled flow of hot, inert gas, such as nitrogen, is injected into the bottom of the stripper fractionating column 20 at 46 to reduce the required PAA partial pressure. The inert gas ascends the stripper column with the PAA vapors and is washed with such vapors by the descending liquid PAA. The inert gas is effective, together with the PAA vapors, to strip residual HBr from the heat treated liquid PAA. By the use of such an inert gas, the PAA vapors in the stripper column can be generated at a temperature of 540–560° F. (approximating the boiling point of PAA at atmospheric pressure) under superatmospheric pressure. Although higher boiling temperatures can be used to produce the PAA vapor at elevated pressures, so long as they are not so high as to cause undesirable side reactions, e.g. decomposition of the PAA, it is usually best for the PAA not to exceed a temperature of about 560–600° F. Instead of nitrogen, flue gases and other inert gases, such as helium and $CO_2$, can be used which can be introduced with the recycled HBr into the reaction zone.

The amount of inert gas introduced into the bottom of the stripper fractionating column 20 depends on the temperature and pressure used in the stripping column and on the rate of boil-up of the PAA vapor in such column. Thus, the amount of inert gas injected into the stripper column 20 in mols per hour is preferably equal to $[M/1.15KP_A]-M$ where M is equal to lbs. per hour of PAA boil-up in the fractionator or stripper column, $P_A$ is equal to the absolute pressure in the fractionator in atmospheres and K is the ratio of the vapor pressure of PAA (at the base of the fractionator) at the temperature in the fractionator to the vapor pressure of PAA at 550° F. in the fractionator. Thus, when the fractionator temperature is 550° F., K is equal to 1. Where the fractionator pressure is 40 p.s.i.g. (an absolute pressure in atmospheres of about 3.7) at this temperature (550° F.), then $KP_A$ is equal to 3.7. M depends on the size of the plant and design of the stripper and, accordingly, can vary over a wide range. Usually, it will be between about 0.2% and 2% of the rate of PAA production in lbs. of PAA per hour. In a commercial plant design an M of 7.5 proved satisfactory with a stripper pressure of 40 p.s.i.g. and a stripper temperature of 550° F.

The rate of PAA feed to the fractionator is, of course, dependent on the rate of PAA production.

If the stripper operation is carried out at atmospheric pressure, inert gases are not required.

The stripper fractionating column 20 may contain conventional packing, e.g. Berl Saddles, or be provided with conventional type plates or sieve trays to achieve intimate gas-liquid contact.

Preferably, the stripper fractionating column 20 is made of titanium or aluminum clad steel. Titanium is preferred at the high temperature involved. The column and parts may be titanium clad.

The stripping operation is, of course, a continuous operation and, when the heat treatment operation is also continuous, the entire removal, recovery and recycle of bromine promoter is on a continuous basis, as well as the reaction in the reactor, the condensation of the crude PAA in the product gas and the distillation of the crude PAA to recover the PAA product.

With the use on a commercial operating scale of the combined heat treatment and stripping steps described above, between 70% and 90% of the total bromine promoter fed to the o-xylene oxidation reactor, e.g. newly added HBr and recycled HBr, can be recovered from the crude PAA in the vapor output from the reflux condenser 38. Accordingly, by recycling this recovered HBr, optimum bromine promoter concentrations can be maintained in the reaction zone to achieve close to maximum yield with between 70% and 90% less newly added bromine promoter.

The remaining bromine in the crude PAA appears to be in the form of heat and acid stable organic compounds in which the Br is directly attached to an aromatic ring. These kinds of bromine compounds are not harmful. A substantial amount of these remaining bromine compounds are removed as pitch during distillation of the crude PAA to recover the final PAA product. These bromine compounds are not corrosive and do not discolor the PAA product. Consequently, by use of the combined heat treatment and stripping steps, corrosion problems in the PAA refining system, i.e. the distillation equipment and associated apparatus, are avoided.

An important advantage of the stripping step of the present invention is that the entire output thereof can be recycled, as is, directly back to the reactor without any further treatment, except for the reflux condenser to reflux the PAA, to achieve the aforesaid yield improvement in the reactor.

It is highly advantageous for the recycle line 44 between the reflux condenser 38 and reactor to be heated to maintain the temperature of the vapors above the outlet temperature of the reflux condenser, i.e. well above the dew point of the contained HBr and water vapor, to circumvent the known corrosiveness of HBr and liquid water.

In addition to the HBr, water vapor, $SO_2$ and volatile organics, the exit gas from the reflux condenser 38 also contains the inert gas, nitrogen, as well as traces of oxygen, $CO_2$ and CO.

It is not intended that the present invention be limited to or by the aforesaid description or accompanying drawing but only to the methods claimed in the appended claims and their equivalents.

I claim:

1. A method of recovering HBr from crude phthalic anhydride containing HBr and made by the vapor phase, catalytic, air oxidation of o-xylene in the presence of a bromine promoter, said method comprising heating the crude phthalic anhydride to an elevated temperature to remove HBr therefrom, and thereafter stripping residual HBr from said heat treated phthalic anhydride by passing it through a fractionating stripper column in countercurrent flow with phthalic anhydride vapor, whereby said phthalic anhydride vapor strips said residual HBr from said heat treated phthalic anhydride.

2. A method according to claim 1, said phthalic anhydride stripping vapor being generated by vaporizing stripped heat treated phthalic anhydride from said stripper column.

3. A method according to claim 1, the phthalic anhydride vapor containing stripped HBr being passed through reflux condenser means to condense out said phthalic anhydride vapor, the condensed phthalic anhydride stripping vapor being refluxed back to said stripper column.

4. A method according to claim 3, the vapors evolved from said heat treatment step being passed through said reflux condenser means to condense out phthalic anhydride contained therein.

5. A method according to claim 4, said phthalic anhydride stripping vapor being generated by vaporizing stripped heat treated phthalic anhydride from said stripper column.

6. A method according to claim 1, said elevated temperature being between about 500° F. and 600° F.

7. A method according claim 6, said elevated temperature being between about 520° F. and 550° F.

8. A method according to claim 1, said stripping step including the step of injecting inert gas into the base of the stripper column.

9. A method according to claim 8, said stripping step being carried out at superatmospheric pressure, said inert gas being added to reduce the required phthalic anhydride partial vapor pressure.

10. A method according to claim 1, the crude phthalic anhydride subjected to said heat treating step being phthalic anhydride condensate from the product gases from the o-xylene oxidation reaction zone, said heat treatment step being carried out at superatmospheric pressure.

11. A method according to claim 1, including recycling the HBr from said heat treatment step and from said stripping step, back to the o-xylene oxidation reaction zone.

12. A method according to claim 11, the phthalic anhydride stripping vapor containing stripped HBr being passed through reflux condenser means to condense out said phthalic anhydride stripping vapor, the condensed phthalic anhydride stripping vapor being refluxed back to said stripper column.

13. A method according to claim 12, said stripping step being carried out at superatmospheric pressure and including the step of injecting inert gas into the base of said stripper to thereby reduce the phthalic anhydride partial vapor pressure.

14. A method according to claim 13, said phthalic anhydride vapor being generated by vaporizing stripped heat treated phthalic anhydride from said stripper column.

15. A method according to claim 14, said elevated temperature being between about 500° F. and 600° F. and said heat treatment step being carried out at superatmospheric pressure.

16. A method according to claim 15, said elevated temperature being between about 520° F. and 550° F. the crude phthalic anhydride subjected to said heat treatment step being phthalic anhydride condensate from the product gases from the o-xylene oxidation reaction zone.

17. A method according to claim 15, the vapors evolved during said heat treatment step being passed through said reflux condenser means to condense out phthalic anhydride contained therein.

18. A method according to claim 12, the vapors evolved from said heat treatment step being passed through said reflux condenser means to condense out phthalic anhydride contained therein.

19. A method according to caim 18, said phthalic anhydride stripping vapor being generated by vaporizing stripped heat treated phthalic anhydride from said stripper column.

20. A method according to claim 11, said stripping step including the step of injecting inert gas into the base of said stripper column.

21. A method according to claim 20, said stripping step being carried out at supeatmospheric pressure, said inert gas being effective to reduce the required phthalic anhydride partial vapor pressure.

22. A method according to claim 21, said elevated temperature being between about 500° F. and 600° F., said heat treatment step being carried out a superatmospheric pressure.

23. A method according to claim 11, said phthalic anhydride stripping vapor being generated by vaporizing stripped heat treated phthalic anhydride from said stripper column.

References Cited

UNITED STATES PATENTS

| 3,004,067 | 10/1961 | Whitfield et al. | 260—346.7 XR |
| 3,328,429 | 6/1967 | Meinstein et al. | 260—346.7 |
| 3,364,235 | 1/1968 | Bloom | 260—346.7 |

EDWARD STERN, *Primary Examiner.*

U.S. Cl. X.R.

260—346.7